United States Patent [19]

Johnson

[11] 4,406,149
[45] Sep. 27, 1983

[54] CABLE-BENDING TOOL
[75] Inventor: Dean E. Johnson, Great Falls, Mont.
[73] Assignee: Phillips Petroleum Company, Bartlesville, Okla.
[21] Appl. No.: 259,744
[22] Filed: May 1, 1981
[51] Int. Cl.³ .................................... B21D 7/00
[52] U.S. Cl. ................................................ 72/458
[58] Field of Search ............... 72/458, 457, 459, 479, 72/391, 470, 476

[56] References Cited
U.S. PATENT DOCUMENTS

| D. 132,381 | 5/1942 | Tabb . | |
|---|---|---|---|
| D. 193,685 | 9/1962 | Leonardo . | |
| 1,393,830 | 10/1921 | Rosenfeld | 72/458 |
| 1,640,426 | 8/1927 | Pike . | |
| 1,746,011 | 2/1930 | Paratschet . | |
| 2,732,743 | 1/1956 | Hart | 72/458 |
| 3,613,430 | 10/1971 | Crees | 72/318 |
| 3,783,674 | 1/1974 | Hinerman | 72/476 |
| 3,841,176 | 10/1974 | Murphy | 72/458 |
| 3,988,918 | 11/1976 | Crees | 72/458 |
| 4,315,422 | 2/1982 | McBride | 72/458 |

FOREIGN PATENT DOCUMENTS 2028701  3/1980  United Kingdom ................. 72/391

Primary Examiner—Gene Crosby

[57] ABSTRACT

A cable-bending tool is provided which comprises a first rod, or torsion arm, having cable-engaging means at one end and means for attaching a second rod, or lever arm, at the opposite end. In use, the cable-engaging means is positioned on the cable at the location of the desired bend, the lever arm is attached to the second end of the torsion arm, and the lever arm is rotated to apply force to the cable via the torsion arm. The invention enables the bending of cables within breaker boxes or other restricted areas with a simple, hand-held tool.

8 Claims, 2 Drawing Figures

CABLE-BENDING TOOL

BACKGROUND

The invention relates to tools and methods for bending and shaping objects. It relates in one aspect to tools for bending electrical cable within an enclosure having restricted access.

In construction and electrical installation work, it is frequently necessary to bend heavy, stiff electrical conductors in recessed or enclosed areas which are not readily accessible to workers. Various devices have been used to shape electrical conductors within breaker boxes, including makeshift tools designed for other purposes and more specialized cable-bending devices which are somewhat bulky or poorly designed for use in tight spaces.

For certain cable-bending applications, it is desirable to have a simple, hand-operated tool capable of bending heavy electrical cables in a breaker box or other area of restricted access.

An object of the invention is therefore to provide a hand-operated tool useful for bending heavy electrical cable within a breaker box or other area of limited access.

SUMMARY OF THE INVENTION

According to the invention, a tool for bending cable comprises a first rod, or torsion arm, having at one end cable engaging means, herein referred to as the head, for manipulating an elongated object to be bent, and at the opposite end means for attaching a second rod, or lever arm, for applying torque to the first rod. The head can be a cylindrical sleeve which can be positioned around the cable at the location to be bent, the sleeve being attached to the first rod at a point along the outer cylindrical surface of the sleeve. The means for attaching the lever arm can be, for example a square-drive socket suitable for receiving a drive wrench, which can be used as the lever arm. The use of the cable-bending tool involves the steps of placing the head of the tool over the cable and positioning it at the point to be bent; attaching the lever arm to the torsion arm; and applying force to the lever arm in the direction of the desired bend in the cable. The tool is used progressively toward the unattached end of the cable to make any necessary bends and can be removed from the unattached end of the cable when all required bends are complete. The invention cable-bending tool provides a simple, inexpensive hand tool for bending electrical cables within a breaker box or similar enclosure.

DETAILED DESCRIPTION OF THE INVENTION

The cable bending tool of the invention includes a first rod, herein referred to as the "torsion arm," of suitable length and width for the bending task to be performed. The length of the torsion arm will of course depend upon the depth of the confined area and the location of the cable within it, but this portion of the tool for most purposes will range in length from about 200 mm to about 1 meter and in diameter from about 1 to about 3 mm. A particularly suitable torsion arm is a section of ½ schedule 80 wrought steel pipe, 12 to 14 inches in length.

The head portion of the cable-bending tool is of any suitable size and shape to receive and manipulate a section of the cable to be bent. The head is preferably, because of the simplicity of the design, a hollow cylinder or sleeve, such as a length of pipe symmetrically attached to one end of the torsion arm at a point along the length of the cylinder. The size of the tool head can vary depending upon the size of the cable to be shaped, but the head will generally be from about 25 mm to about 130 mm. A particularly suitable sleeve type head is a section of wrought steel pipe, such as 1¼ schedule 40, about 1½ to about 2½ inches in length, mill rounded inside each end to about ¼ to ½ inch deep.

The head portion can, if desired, include means for grasping or securing the cable such as adjustable jaws. It can be designed as a cylindrical sleeve having a lengthwise opening through which the cable can be readily inserted, engaged, and removed from the head.

The end of the cable-bending tool opposite the head comprises means for joining a second rod, or "lever arm," to the first rod so as to enable the transfer of force applied to the lever arm to the torsion arm and thence to the cable. The joining means is preferably a square drive socket, but it can be any other suitable means for temporarily or permanently adjoining one mechanical element to another.

The attachment means permits the joinder, during use of the tool, of the torsion arm to the lever arm. The lever arm is a rod which is suitably designed and positioned so as to provide means for the application of torque to the torsion arm and thereby to the cable positioned within the head of the tool. The lever arm is preferably attached to the torsion arm at about a 90° orientation, but the angle can vary depending upon the specific use to which the tool is put. The lever arm is conveniently a socket drive wrench or similar instrument having an attachment end portion complementary in size and design to that of the attachment end of the bar.

Figure 1:
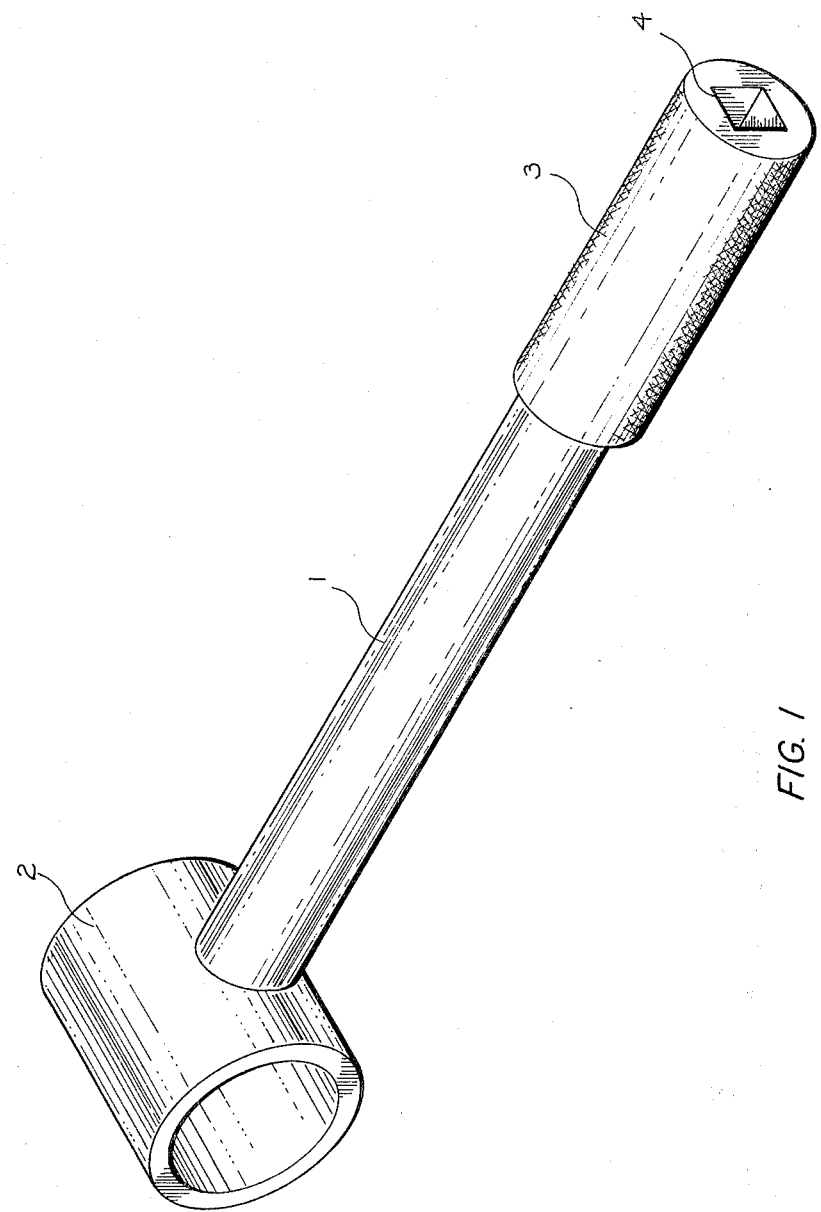
FIG. 1 is a pictorial view of an embodiment of the invention cable-bending tool.

The tool can be further described by reference to FIG. 1, which shows an embodiment of cable-bending tool of the invention. The illustrated tool includes a lever arm 1 having a cable end 2, which is a cylindrical sleeve. At the opposite end of bar 1 is shown drive receptacle 3 and drive socket 4.

Figure 2:
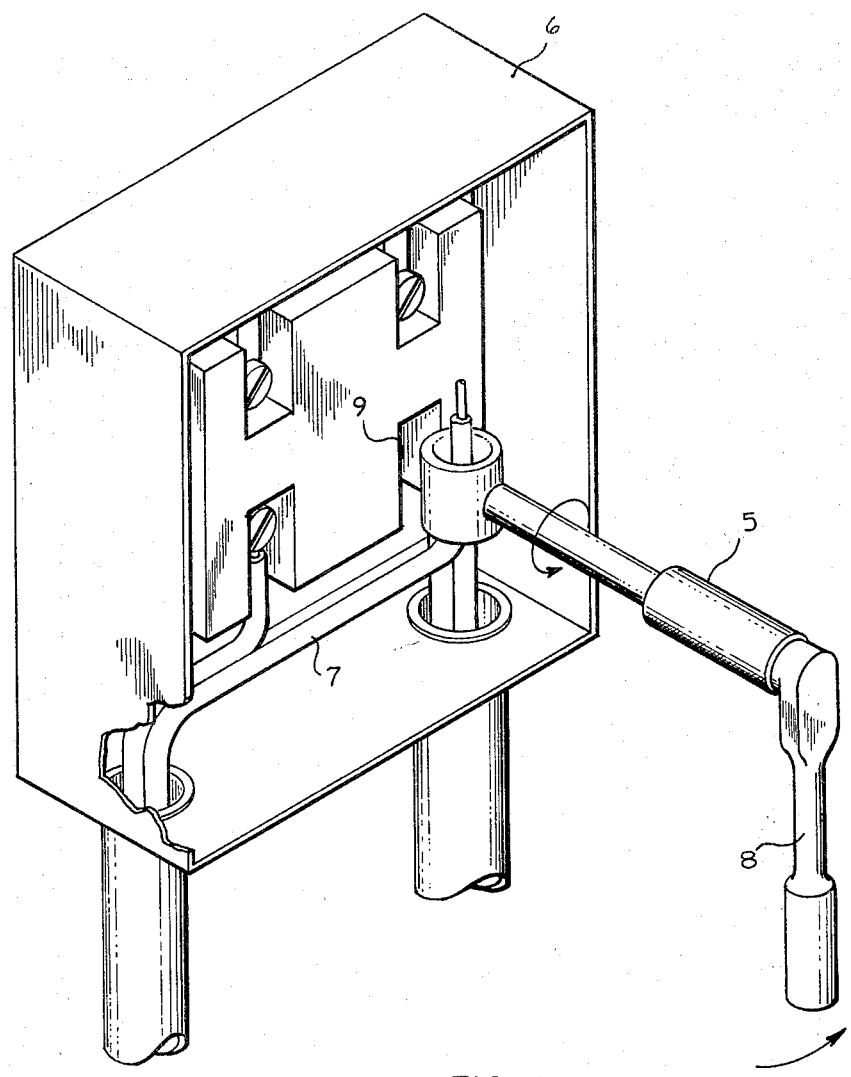
FIG. 2 is a sketch illustrating the invention cable-bending tool in use in a breaker box.

FIG. 2 shows the cable-bending tool 5 positioned within an electrical switch box 6 so as to bend electrical conductor 7 by the application of force to square drive wrench 8. The applied force is transferred to the cable, which is bent so as to position the end of the cable at electrical terminal 9. In the embodiment illustrated the axis of rotation of the tool is at right angles with respect to the central axis of the sleeve-type cable-engaging means.

The method of using the invention for bending cable involves the steps of positioning the head of the tool about the cable at the location of the desired bend, attaching the lever arm (if not previously attached), and applying force to the lever arm so as to manipulate the head, thereby bending the cable in response to the force applied. The cable-bending tool can be retained in place while the terminal end of the cable is shaped for connection to the terminal. The tool is particularly designed for the application of rotation about the axis of the torsion arm by movement of the lower arm in a plane perpendicular to the axis of rotation of the torsion arm and the consequent bending of the cable in the direction of movement of the lever arm. The axis of the torsion arm will generally be placed at right angles to the plane of the desired bend, and the lever arm and torsion arm will describe a right angle within the plane of the tool axis.

The cable-bending tool is designed primarily for bending and shaping heavy electrical cables for terminal connection in industrial switching panels and breaker boxes. However, the invention is suitable for any number of applications requiring bending or shaping of elongated objects in areas of limited access.

That which is claimed is:

1. A cable-bending tool comprising:
   a torsion arm comprising a first rod having a first end and a second end;
   cable-engaging means at the first end of the torsion arm, the cable-engaging means comprising a cylindrical sleeve affixed perpendicularly to the first rod; and
   means for attaching a lever arm in the form of a second rod to the second end of the torsion arm.

2. The cable-bending tool of claim 1 in which the first rod is from about 200 mm to about 1 meter in length.

3. A cable-bending tool comprising:
   a torsion arm having a first end and a second end;
   cable-engaging means comprising a cylindrical sleeve affixed to the first end of the torsion arm; and
   a square-drive socket for attachaing a lever arm to the second end of the torsion arm.

4. The cable-bending tool of claim 3 in which the angle defined by the torsion arm and the central axis of the cylindrical sleeve is about 90°.

5. The cable-bending tool of claim 1 which further comprises the lever arm in the form of the second rod attached to the second end of the torsion arm.

6. A method for bending cable which comprises:
   engaging a length of the cable to be bent with cable-engaging means of a cable-bending tool comprising:
   a torsion arm comprising a first rod having a first end and a second end;
   cable engaging means at the first end of the torsion arm, the cable-engaging means comprising a cylindrical sleeve affixed perpendicularly to the first rod;
   means for attaching a lever arm comprising a second rod to the second end of the torsion arm; and
   applying force to the lever arm so as to rotate the torsion arm about its longitudinal axis and effect movement of the cable-engaging means, thereby bending the cable.

7. A method for bending electrical cable one end portion of which is to be connected to an electrical terminal, the method comprising
   engaging a length of the electrical cable to be bent with cable-engaging means of a cable-bending tool comprising:
   a torsion arm having a first end and a second end;
   cable-engaging means at the first end of the torsion arm;
   means for attaching a lever arm to the second end of the torsion arm;
   holding the cable in position with the cable-bending tool while preparing the cable end for attachment to the terminal; and
   applying force to the lever arm so as to rotate the torsion arm about its longitudinal axis and effect movement of the cable-engaging means, thereby bending the cable.

8. The method of claim 6 in which the rotation of the torsion arm about its longitudinal axis is effected by movement of the lever arm in a plane at right angles to the longitudinal axis of the torsion arm.

* * * * *